United States Patent
Lu

(10) Patent No.: US 9,361,214 B2
(45) Date of Patent: Jun. 7, 2016

(54) SYSTEM OF GENERATING SCRAMBLE DATA AND METHOD OF GENERATING SCRAMBLE DATA

(71) Applicant: Etron Technology, Inc., Hsinchu (TW)

(72) Inventor: Wen-Min Lu, Hsinchu (TW)

(73) Assignee: Etron Technology, Inc., Hsinchu (TW)

( * ) Notice: Subject to any disclaimer, the term of this patent is extended or adjusted under 35 U.S.C. 154(b) by 176 days.

(21) Appl. No.: 13/873,260

(22) Filed: Apr. 30, 2013

(65) Prior Publication Data

US 2013/0346679 A1    Dec. 26, 2013

Related U.S. Application Data

(60) Provisional application No. 61/662,362, filed on Jun. 21, 2012.

(51) Int. Cl.
| | |
|---|---|
| *G06F 12/00* | (2006.01) |
| *G06F 7/58* | (2006.01) |
| *G06F 21/60* | (2013.01) |
| *G06F 12/02* | (2006.01) |

(52) U.S. Cl.
CPC *G06F 12/00* (2013.01); *G06F 7/58* (2013.01); *G06F 7/582* (2013.01); *G06F 7/584* (2013.01); *G06F 12/0246* (2013.01); *G06F 21/60* (2013.01)

(58) Field of Classification Search
CPC ..... G06F 12/0246; G06F 7/584; G06F 21/60; G06F 7/58; G06F 7/582
See application file for complete search history.

(56) References Cited

U.S. PATENT DOCUMENTS

| | | | | |
|---|---|---|---|---|
| 5,912,973 | A * | 6/1999 | Hiramatsu et al. | 380/28 |
| 7,263,540 | B1 * | 8/2007 | Kuehnel | G06F 7/584 |
| | | | | 708/256 |
| 2009/0172266 | A1 * | 7/2009 | Kimura | 711/103 |
| 2009/0323942 | A1 | 12/2009 | Sharon | |
| 2010/0070549 | A1 * | 3/2010 | Nagaraj | G06F 7/588 |
| | | | | 708/254 |

* cited by examiner

*Primary Examiner* — Aracelis Ruiz
(74) *Attorney, Agent, or Firm* — Winston Hsu; Scott Margo

(57) ABSTRACT

A system of generating scramble data includes a linear feedback shift register and a scramble engine. The linear feedback shift register is used for generating a plurality of first scramble values according to an initial value. The scramble engine is coupled to the linear feedback shift register for utilizing at least one bit of a first scramble value of the plurality of first scramble values to execute a first logic operation on other bits of the first scramble value to generate a second scramble value corresponding to the first scramble value. A bit number of the second scramble value is the same as a bit number of the first scramble value.

13 Claims, 11 Drawing Sheets

SYSTEM OF GENERATING SCRAMBLE DATA AND METHOD OF GENERATING SCRAMBLE DATA

CROSS REFERENCE TO RELATED APPLICATIONS

This application claims the benefit of U.S. Provisional Application No. 61/662,362, filed on Jun. 21, 2012 and entitled "Data Scramble Engine," the contents of which are incorporated herein by reference.

BACKGROUND OF THE INVENTION

1. Field of the Invention

The present invention relates a system of generating scramble data and a method of generating scramble data, and particularly to a system of generating scramble data and a method of generating scramble data that can utilize a scramble engine to generate low correlation second scramble values according to first scramble values generated by a linear feedback shift register.

2. Description of the Prior Art

In the prior art, a system of generating scramble data utilizes a linear feedback shift register (LFSR) to generate a plurality of scramble values according to an initial value, e.g. 0x23 (0010_0011), 0x47 (0100_0111), 0x8F (1000_1111), and so on. Then, a logic gate executes a logic operation on the plurality of scramble values and data from a host to generate and output scramble data corresponding to the data from the host to a NAND flash.

The linear feedback shift register shifts left a scramble value one bit to generate a next scramble value. For example, the linear feedback shift register shifts left a scramble value 0x23 (0010_0011) one bit to generate a next scramble value 0x47 (0100_0111). But, it is noted that because the linear feedback shift register shifts left the scramble value 0x23 (0010_0011) one bit to generate the scramble value 0x47 (0100_0111), 7 identical bits exist between the scramble value 0x23 (0010_0011) and the scramble value 0x47 (0100_0111). That is to say, a correlation between the scramble value 0x23 (0010_0011) and the scramble value 0x47 (0100_0111) is high. Therefore, a correlation between any two adjacent scramble data generated by the logic gate according to scramble values generated by the linear feedback shift register is also high. Thus, scramble data generated by the logic gate can not satisfy a specification of the NAND flash.

SUMMARY OF THE INVENTION

An embodiment provides a system of generating scramble data. The system includes a linear feedback shift register and a scramble engine. The linear feedback shift register is used for generating a plurality of first scramble values according to an initial value. The scramble engine is coupled to the linear feedback shift register for utilizing at least one bit of a first scramble value of the plurality of first scramble values to execute a first logic operation on other bits of the first scramble value to generate a second scramble value corresponding to the first scramble value. A bit number of the second scramble value is the same as a bit number of the first scramble value.

Another embodiment provides a method of generating scramble data. The method includes generating a plurality of first scramble values according to an initial value; and utilizing at least one bit of a first scramble value of the plurality of first scramble values to execute a first logic operation on other bits of the first scramble value to generate a second scramble value corresponding to the first scramble value, where a bit number of the second scramble value is the same as a bit number of the first scramble value.

The present invention provides a system of generating scramble data and a method of generating scramble data. The system and the method utilize a scramble engine to generate a second scramble value according to a first scramble value generated by a linear feedback shift register, where a correlation between any two adjacent second scramble values is low. Therefore, a correlation between any two adjacent scramble data generated by the present invention through a logic gate is also low. Thus, compared to the prior art, scramble data generated by the present invention can satisfy a specification of a NAND flash.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
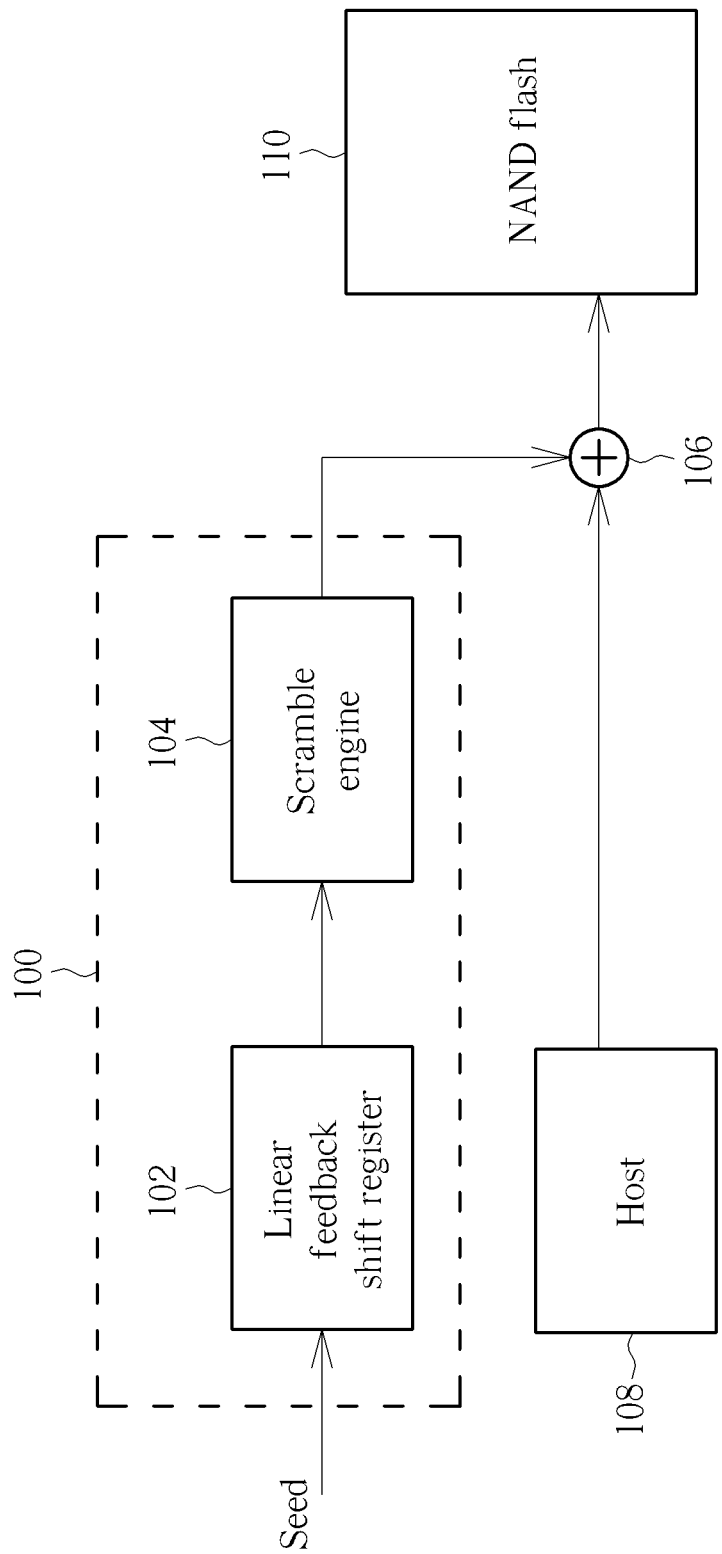
FIG. 1 is a diagram illustrating a system of generating scramble data according to an embodiment.

Please refer to FIG. 1. FIG. 1 is a diagram illustrating a system 100 of generating scramble data according to an embodiment. The system 100 includes a linear feedback shift register (LFSR) 102 and a scramble engine 104. The linear feedback shift register 102 is used for generating a plurality of first scramble values according to an initial value seed; and the scramble engine 104 is coupled to the linear feedback shift register 102.

Figure 2:
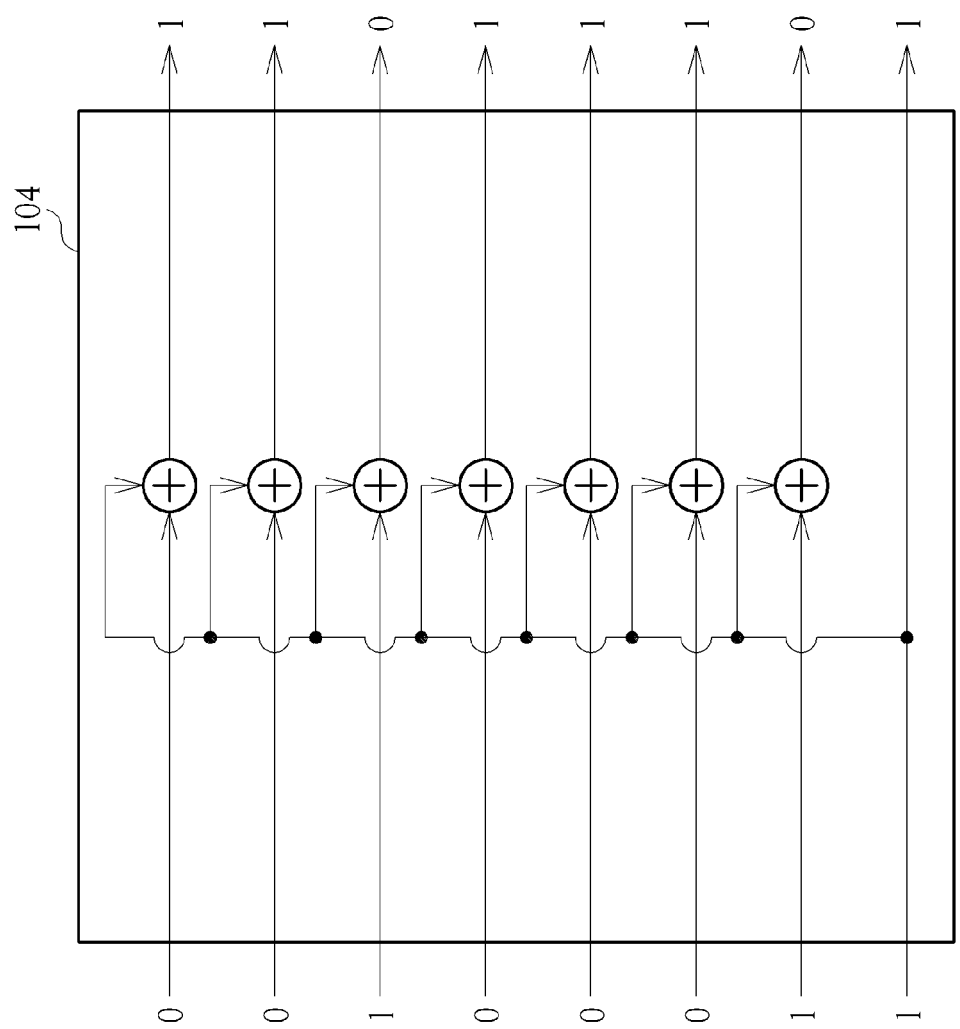
FIG. 2 is a diagram illustrating a scramble engine.

Please refer to FIG. 2. FIG. 2 is a diagram illustrating the scramble engine 104. As shown in FIG. 2, the scramble engine 104 is used for utilizing a first bit of each first scramble value of the plurality of first scramble values to execute a first logic operation on other bits of the first scramble value to generate a second scramble value corresponding to the first scramble value, where a bit number of the second scramble value is the same as a bit number of the first scramble value. For example, when the scramble engine 104 receives a first scramble value 0x23 (0010_0011), the scramble engine 104 utilizes a first bit 1 of the first scramble value 0x23

(0010_0011) to execute the first logic operation on other bits 0, 0, 1, 0, 0, 0, and 1 of the first scramble value 0x23 (0010_0011) to generate a second scramble value 0xDD (1101_1101) corresponding to the first scramble value 0x23 (0010_0011), where a bit number of the second scramble value 0xDD (1101_1101) is the same as a bit number of the first scramble value 0x23 (0010_0011), and the first logic operation can be an exclusive OR logic operation. But, the present invention is not limited to the bit number of the first scramble value in FIG. 2 being 8. That is to say, the first scramble value in FIG. 2 can also have other bit numbers. In addition, the present invention is also not limited to the first logic operation being the exclusive OR logic operation. That is to say, the first logic operation can be also other logic operations. Similarly, when the scramble engine 104 receives a first scramble value 0x47 (0100_0111), the scramble engine 104 utilizes a first bit 1 of the first scramble value 0x47 (0100_0111) to execute the first logic operation on other bits 0, 1, 0, 0, 0, 1, and 1 of the first scramble value 0x47 (0100_0111) to generate a second scramble value 0xB9 (1011_1001) corresponding to the first scramble value 0x47 (0100_0111). Therefore, a correlation between the second scramble value 0xDD (1101_1101) and the second scramble value 0xB9 (1011_1001) generated through the scramble engine 104 is not high.

As shown in FIG. 1, the system 100 further includes a logic gate 106, where the logic gate 106 can be an exclusive OR gate, and a second logic operation can be an exclusive OR logic operation. The logic gate 106 is coupled to the scramble engine 104 for executing the second logic operation on a second scramble value and a datum from a host 108 to generate and output a scramble datum corresponding to the datum from the host 108 to a NAND flash 110, where a bit number of the datum, a bit number of the second scramble value, and a bit number of the scramble datum are the same. For example, when the logic gate 106 receives a second scramble value 0xDD (1101_1101) and a datum 0x20 (0010_0000) from the host 108, the logic gate 106 executes the second logic operation on the second scramble value 0xDD (1101_1101) and the datum 0x20 (0010_0000) to generate and output a scramble datum 0xFD (1111_1101) corresponding to the datum 0x20 (0010_0000) to the NAND flash 110.

Figure 3:
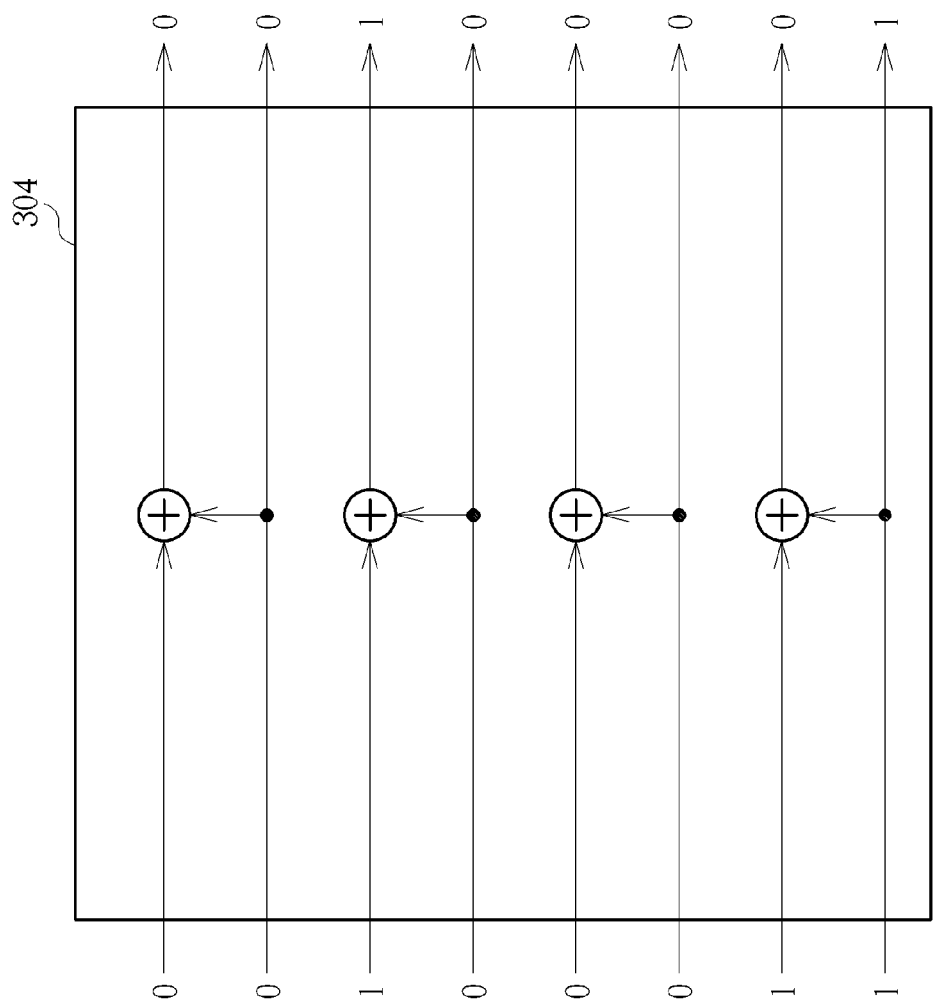
FIG. 3 is a diagram illustrating a scramble engine according to another embodiment.

Please refer to FIG. 3. FIG. 3 is a diagram illustrating a scramble engine 304 according to another embodiment, where the scramble engine 304 can substitute for the scramble engine 104 in FIG. 1. As shown in FIG. 3, the scramble engine 304 utilizes each odd bit of a first scramble value to execute a first logic operation on a corresponding next bit of each odd bit of the first scramble value respectively to generate a second scramble value, where the first logic operation can be an exclusive OR logic operation. But, the present invention is not limited to the first logic operation being the exclusive OR logic operation. That is to say, the first logic operation can be also other logic operations. For example, the scramble engine 304 utilizes a first odd bit 1 of a first scramble value 0x23 (0010_0011) to execute the first logic operation on a next bit 1 of the first odd bit 1 of the first scramble value 0x23 (0010_0011) to generate a first even bit 0 of a second scramble value, utilizes a second odd bit 0 of the first scramble value 0x23 (0010_0011) to execute the first logic operation on a next bit 0 of the second odd bit 0 of the first scramble value 0x23 (0010_0011) to generate a second even bit 0 of the second scramble value, utilizes a third odd bit 0 of the first scramble value 0x23 (0010_0011) to execute the first logic operation on a next bit 1 of the third odd bit 0 of the first scramble value 0x23 (0010_0011) to generate a third even bit 1 of the second scramble value, and utilizes a fourth odd bit 0 of the first scramble value 0x23 (0010_0011) to execute the first logic operation on a next bit 0 of the fourth odd bit 0 of the first scramble value 0x23 (0010_0011) to generate a fourth even bit 0 of the second scramble value. As shown in FIG. 3, the first odd bit, the second odd bit, the third odd bit, and the fourth odd bit of the second scramble value are the same as the first odd bit, the second odd bit, the third odd bit, and the fourth odd bit of the first scramble value, which are 1, 0, 0, and 0, respectively, and the first even bit, the second even bit, the third even bit, and the fourth even bit of the second scramble value are 0, 0, 1, and 0, respectively. Therefore, the scramble engine 304 can generate the second scramble value 0x21 (0010_0001) through the above mentioned process. In addition, the present invention is not limited to a bit number of the first scramble value in FIG. 3 being 8. That is to say, the first scramble value in FIG. 3 can also have other bit numbers. In addition, subsequent operational principles of the scramble engine 304 are the same as those of the scramble engine 104, so further description thereof is omitted for simplicity.

Figure 4:
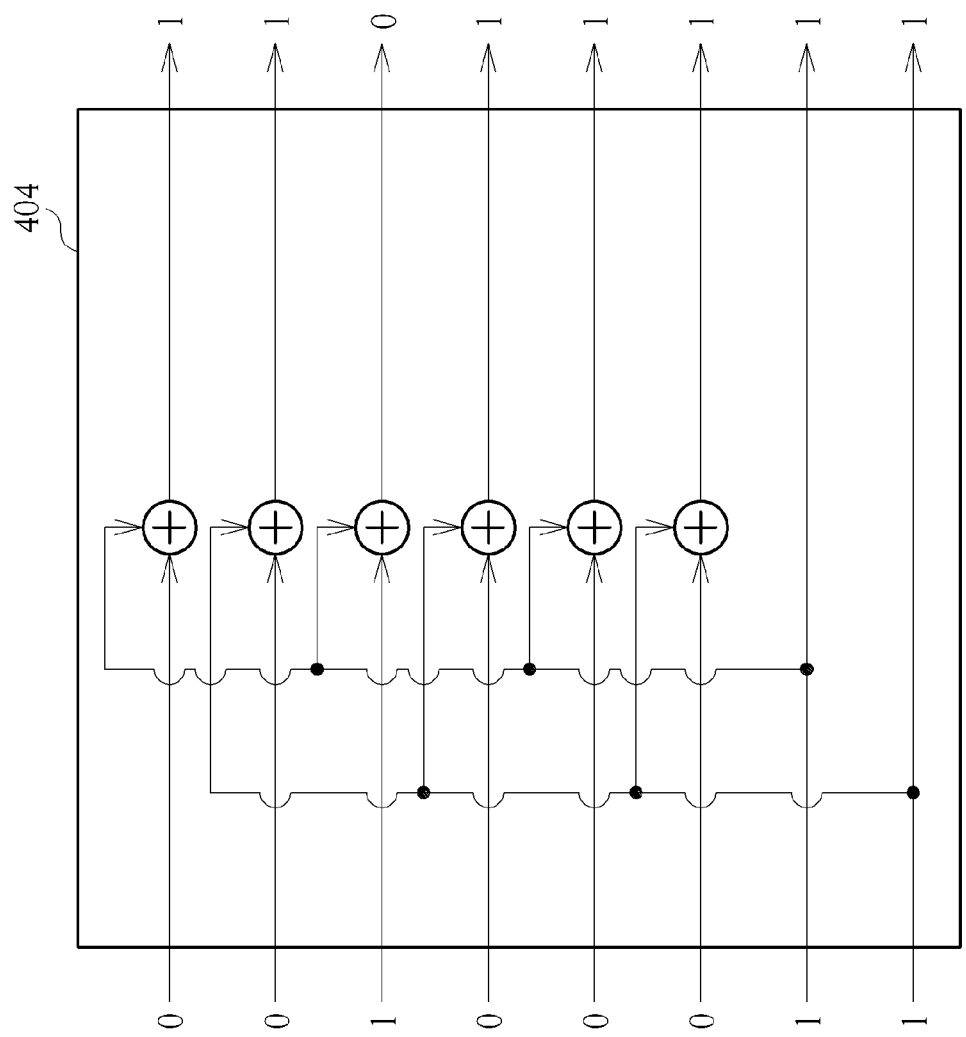
FIG. 4 is a diagram illustrating a scramble engine according to another embodiment.

Please refer to FIG. 4. FIG. 4 is a diagram illustrating a scramble engine 404 according to another embodiment, where the scramble engine 404 can substitute for the scramble engine 104 in FIG. 1. As shown in FIG. 4, the scramble engine 404 utilizes a first odd bit of a first scramble value to execute a first logic operation on other odd bits of the first scramble value, and utilizes a first even bit of the first scramble value to execute the first logic operation on other even bits of the first scramble value to generate a second scramble value, where the first logic operation can be an exclusive OR logic operation. But, the present invention is not limited to the first logic operation being the exclusive OR logic operation. That is to say, the first logic operation can be also other logic operations. As shown in FIG. 4, the scramble engine 404 utilizes a first odd bit 1 of a first scramble value 0x23 (0010_0011) to execute the first logic operation on other odd bits 0, 0, and 0 of the first scramble value 0x23 (0010_0011) to generate a first odd bit 1, a second odd bit 1, a third odd bit 1, and a fourth odd bit 1 of a second scramble value, and utilizes a first even bit 1 of the first scramble value 0x23 (0010_0011) to execute the first logic operation on other even bits 0, 1, and 0 of the first scramble value 0x23 (0010_0011) to generate a first even bit 1, a second even bit 1, a third even bit 0, and a fourth even bit 1 of the second scramble value. Therefore, the scramble engine 404 can generate the second scramble value 0xDF (1101_1111) through the above mentioned process. In addition, the present invention is not limited to a bit number of the first scramble value in FIG. 4 being 8. That is to say, the first scramble value in FIG. 4 can also have other bit numbers. In addition, subsequent operational principles of the scramble engine 404 are the same as those of the scramble engine 104, so further description thereof is omitted for simplicity.

Figure 5:
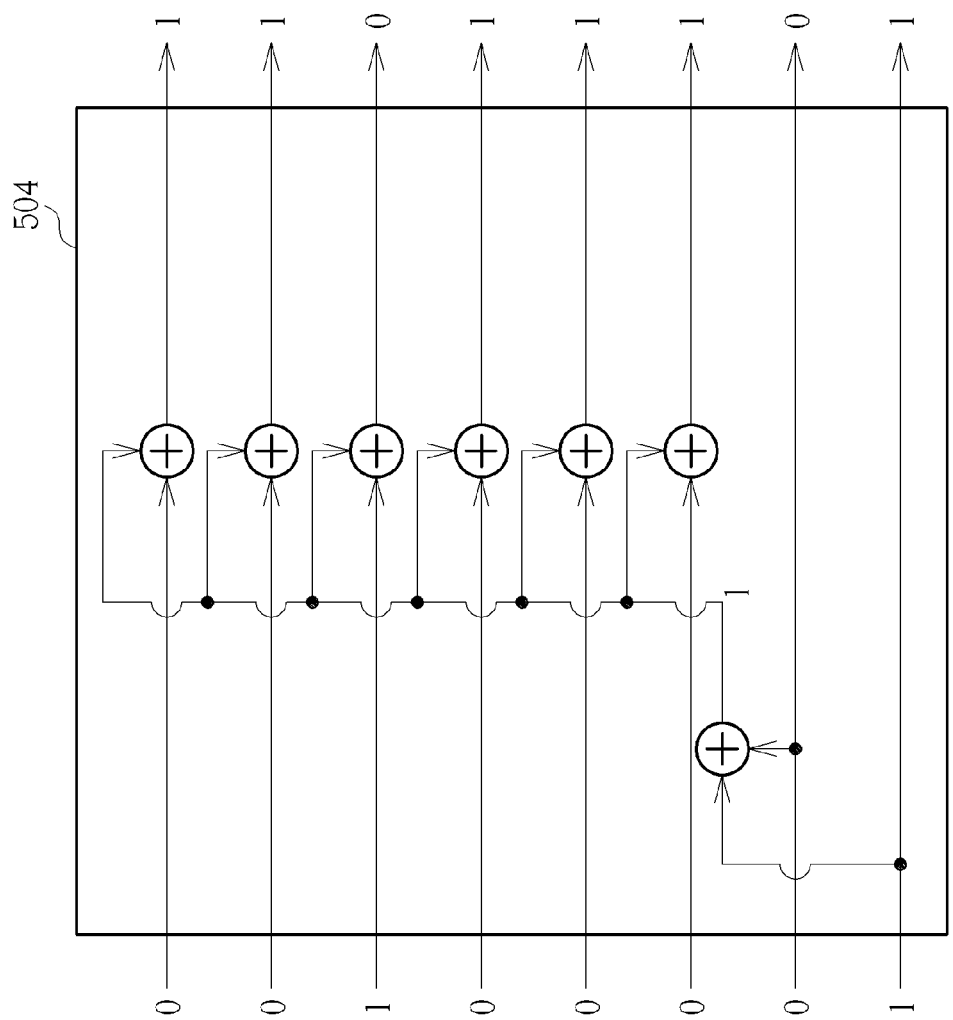
FIG. 5 is a diagram illustrating a scramble engine according to another embodiment.

Please refer to FIG. 5. FIG. 5 is a diagram illustrating a scramble engine 504 according to another embodiment, where the scramble engine 504 can substitute for the scramble engine 104 in FIG. 1. As shown in FIG. 5, the scramble engine 504 first utilizes a first bit of a first scramble value to execute a third logic operation on a second bit of the first scramble value to generate an operation value. Then, the scramble engine 504 utilizes the operation value to execute a first logic operation on other bits of the first scramble value except the first bit and the second bit of the first scramble value to generate a second scramble value, where the first logic operation can be an exclusive OR logic operation. But, the present invention is not limited to the first logic operation being the exclusive OR logic operation. That is to say, the first logic operation can be also other logic operations. In addition, the third logic operation is the same as or different from the first logic operation. As shown in FIG. 5, the scramble engine 504 first utilizes a first bit 1 of a first scramble value 0x21 (0010_0001) to execute the third logic operation (e.g. an exclusive OR logic operation) on a second bit 0 of the first scramble value 0x21 (0010_0001) to generate an operation value 1. Then, the scramble engine 504 utilizes the operation value 1 to execute the first logic operation on other bits of the first scramble value 0x21 (0010_0001) except the first bit 1 and the second bit 0 of the first scramble value 0x21 (0010_0001) to generate other bits 1, 1, 0, 1, 1, and 1 of a second scramble value. The first bit and the second bit of the second scramble value are the same as the first bit and the second bit of the first scramble value respectively. Therefore, the scramble engine 504 can generate the second scramble value 0xDD (1101_1101) through the above mentioned process. In addition, the present invention is not limited to a bit number of the first scramble value in FIG. 5 being 8. That is to say, the first scramble value in FIG. 5 can also have other bit numbers. In addition, subsequent operational principles of the scramble engine 504 are the same as those of the scramble engine 104, so further description thereof is omitted for simplicity.

Figure 6:
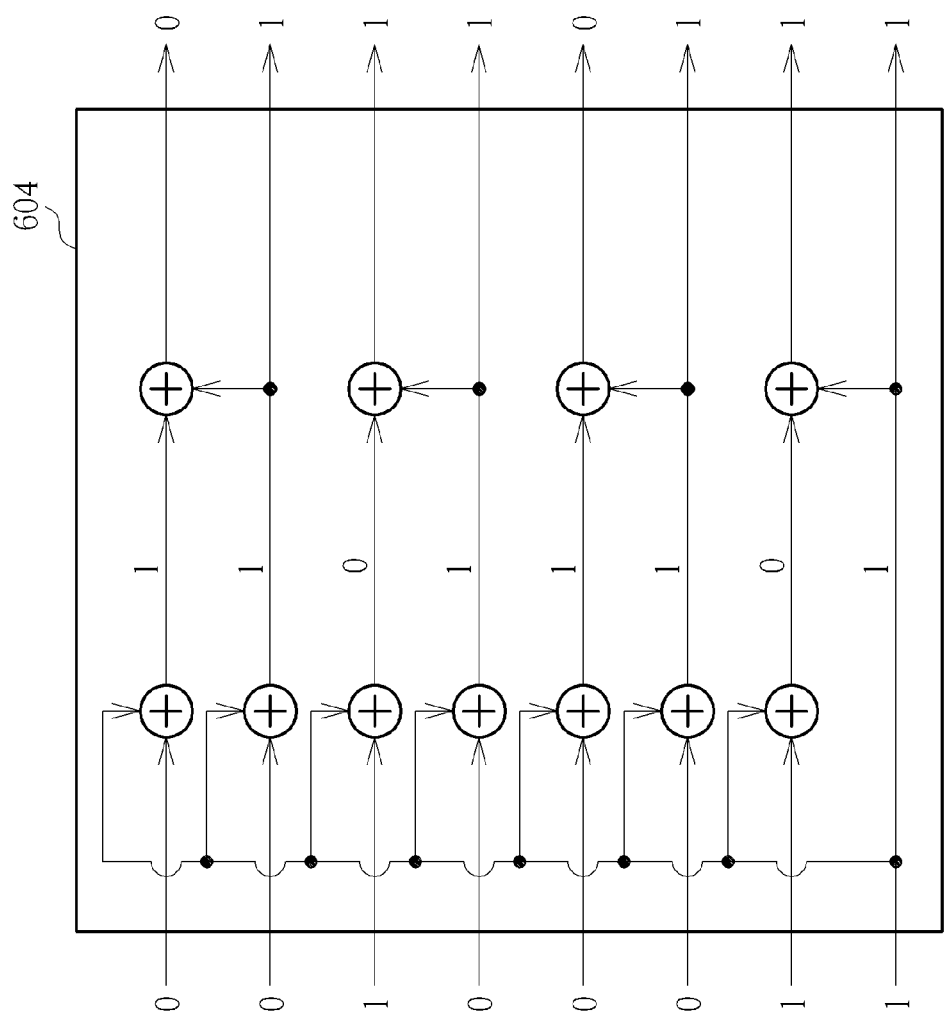
FIG. 6 is a diagram illustrating a scramble engine according to another embodiment.

Please refer to FIG. 6. FIG. 6 is a diagram illustrating a scramble engine 604 according to another embodiment, where the scramble engine 604 can substitute for the scramble engine 104 in FIG. 1. As shown in FIG. 6, the scramble engine 604 first utilizes a first bit of a first scramble value to execute a third logic operation on other bits of the first scramble value to generate a pre-scramble value. Then, the scramble engine 604 utilizes each odd bit of the pre-scramble value to execute a first logic operation on a corresponding next bit of each odd bit of the pre-scramble value respectively to generate a second scramble value, where the first logic operation can be an exclusive OR logic operation. But, the present invention is not limited to the first logic operation being the exclusive OR logic operation. That is to say, the first logic operation can be also other logic operations. In addition, the third logic operation is the same as or different from the first logic operation. As shown in FIG. 6, the scramble engine 604 first utilizes a first bit 1 of a first scramble value 0x23 (0010_0011) to execute the third logic operation (e.g. the exclusive OR logic operation) on other bits 0, 0, 1, 0, 0, 0, and 1 of the first scramble value 0x23 (0010_0011) to generate a pre-scramble value 0xDD (1101_1101) corresponding to the first scramble value 0x23 (0010_0011). Then, the scramble engine 604 utilizes a first odd bit 1 of the pre-scramble value 0xDD (1101_1101) to execute the first logic operation on a next bit 0 of the first odd bit 1 of the pre-scramble value 0xDD (1101_1101) to generate a first even bit 1 of a second scramble value, utilizes a second odd bit 1 of the pre-scramble value 0xDD (1101_1101) to execute the first logic operation on a next bit 1 of the second odd bit 1 of the pre-scramble value 0xDD (1101_1101) to generate a second even bit 0 of the second scramble value, utilizes a third even bit 1 of the pre-scramble value 0xDD (1101_1101) to execute the first logic operation on a next bit 0 of the third even bit 1 of the pre-scramble value 0xDD (1101_1101) to generate a third even bit 1 of the second scramble value, and utilizes a fourth odd bit 1 of the pre-scramble value 0xDD (1101_1101) to execute the first logic operation on a next bit 1 of the fourth odd bit 1 of the pre-scramble value 0xDD (1101_1101) to generate a fourth even bit 0 of the second scramble value. As shown in FIG. 6, the first odd bit, the second odd bit, the third odd bit, and the fourth odd bit of the second scramble value are the same as the first odd bit, the second odd bit, the third odd bit, and the fourth odd bit of the pre-scramble value, which are 1, 1, 1, and 1, respectively, and the first even bit, the second even bit, the third even bit, and the fourth even bit of the second scramble value are 1, 0, 1, and 0, respectively. Therefore, the scramble engine 604 can generate the second scramble value 0x77 (0111_0111) through the above mentioned process. In addition, the present invention is not limited to a bit number of the first scramble value in FIG. 6 being 8. That is to say, the first scramble value in FIG. 6 can also have other bit numbers. In addition, subsequent operational principles of the scramble engine 604 are the same as those of the scramble engine 104, so further description thereof is omitted for simplicity.

In addition, the above mentioned embodiments (as shown in FIG. 2 to FIG. 5) are only used to describing the present invention, that is, the present invention is not limited to the above mentioned embodiments. Therefore, any configuration in which a scramble engine generates low correlation second scramble values according to first scramble values generated by a linear feedback shift register falls within the scope of the present invention.

Figure 7:
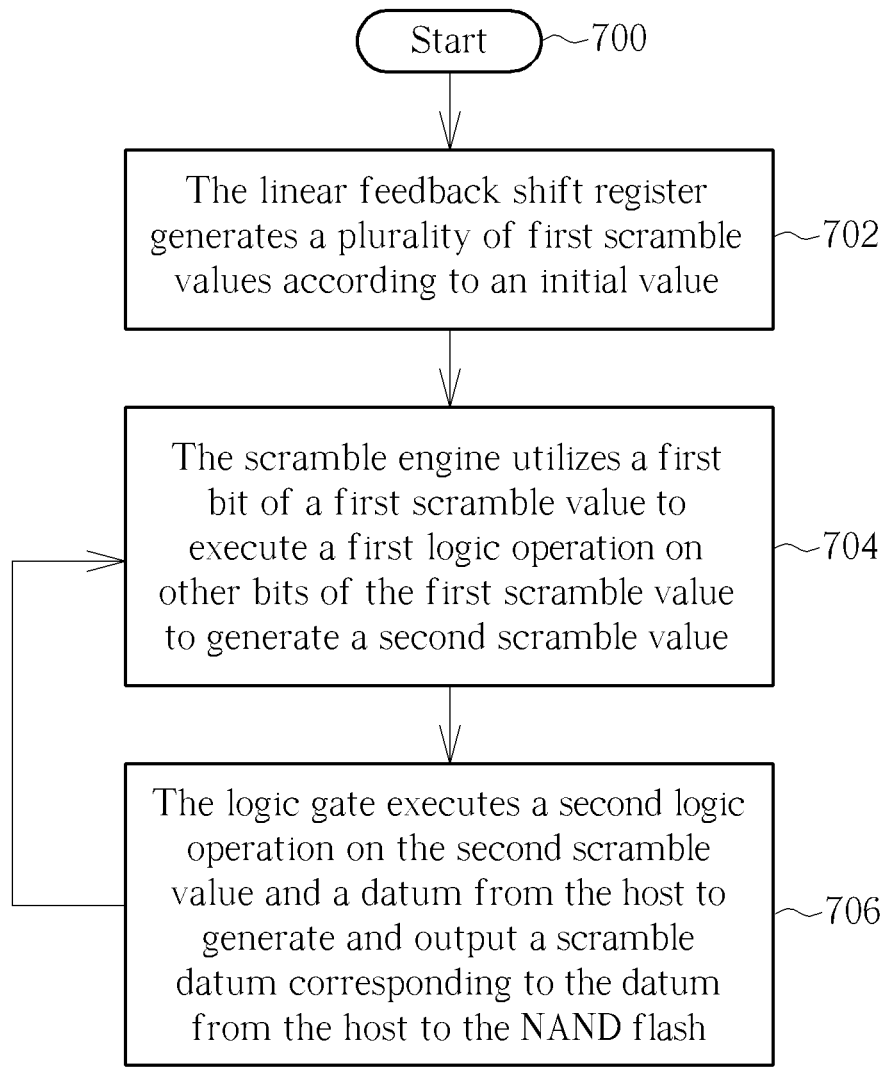
FIG. 7 is a flowchart illustrating a method of generating scramble data according to another embodiment.

Please refer to FIG. 1, FIG. 2, and FIG. 7. FIG. 7 is a flowchart illustrating a method of generating scramble data according to another embodiment. The method in FIG. 7 is illustrated using the system 100 in FIG. 1 and the scramble engine 104 in FIG. 2. Detailed steps are as follows:

Step 700: Start.

Step 702: The linear feedback shift register 102 generates a plurality of first scramble values according to an initial value seed.

Step 704: The scramble engine 104 utilizes a first bit of a first scramble value to execute a first logic operation on other bits of the first scramble value to generate a second scramble value.

Step 706: The logic gate 106 executes a second logic operation on the second scramble value and a datum from the host 108 to generate and output a scramble datum corresponding to the datum from the host 108 to the NAND flash 110; go to Step 704.

In Step 702, the linear feedback shift register 102 generates the plurality of first scramble values (e.g. 0x23 (0010_0011), 0x47 (0100_0111), and son on) according to the initial value seed. In Step 704, the scramble engine 104 is used for utilizing the first bit of the first scramble value to execute the first logic operation on the other bits of the first scramble value to generate the second scramble value corresponding to the first scramble value, where a bit number of the second scramble value is the same as a bit number of the first scramble value. For example, as shown in FIG. 2, when the scramble engine 104 receives a first scramble value 0x23 (0010_0011), the scramble engine 104 utilizes a first bit 1 of the first scramble value 0x23 (0010_0011) to execute the first logic operation on other bits 0, 0, 1, 0, 0, 0, and 1 of the first scramble value 0x23 (0010_0011) to generate a second scramble value 0xDD (1101_1101) corresponding to the first scramble value 0x23 (0010_0011), where a bit number of the second scramble value 0xDD (1101_1101) is the same as a bit number of the first scramble value 0x23 (0010_0011), and the first logic operation can be an exclusive OR logic operation. But, the present invention is not limited to the bit number of the first scramble value in FIG. 2 being 8. That is to say, the first scramble value in FIG. 2 can also have other bit numbers. In addition, the present invention is also not limited to the first logic operation being the exclusive OR logic operation. That is to say, the first logic operation can be also other logic operations. Similarly, when the scramble engine 104 receives a first scramble value 0x47 (0100_0111), the scramble engine 104 utilizes a first bit 1 of the first scramble value 0x47 (0100_0111) to execute the first logic operation on other bits 0, 1, 0, 0, 1, and 1 of the first scramble value 0x47 (0100_0111) to generate a second scramble value 0xB9 (1011_1001) corresponding to the first scramble value 0x47 (0100_0111). Therefore, a correlation between the second scramble value 0xDD (1101_1101) and the second scramble value 0xB9 (1011_1001) generated through the scramble engine 104 is not high. In Step 706, the logic gate 106 is used for executing the second logic operation on the second scramble value and the datum from the host 108 to generate and output the scramble datum corresponding to the datum from the host 108 to the NAND flash 110, where a bit number of the datum from the host 108, a bit number of the second scramble value, and a bit number of the scramble datum are the same. For example, when logic gate 106 receives a second scramble value 0xDD (1101_1101) and a datum 0x20 (0010_0000) from the host 108, the logic gate 106 executes the second logic operation on the second scramble value 0xDD (1101_1101) and the datum 0x20 (0010_0000) to generate and output a scramble datum 0xFD (1111_1101) corresponding to the datum 0x20 (0010_0000) to the NAND flash 110.

Figure 8:
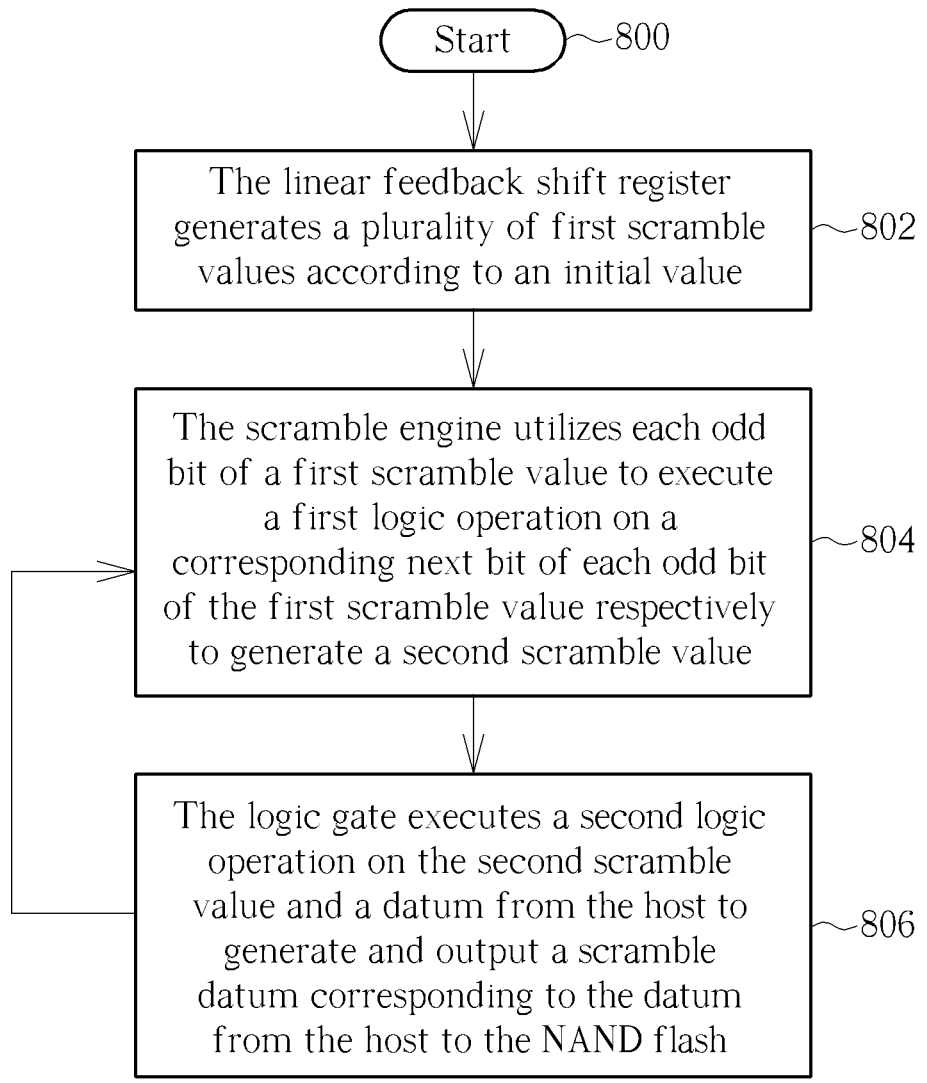
FIG. 8 is a flowchart illustrating a method of generating scramble data according to another embodiment.

Please refer to FIG. 1, FIG. 3, and FIG. 8. FIG. 8 is a flowchart illustrating a method of generating scramble data according to another embodiment. The method in FIG. 8 is illustrated using the system 100 in FIG. 1 and the scramble engine 304 in FIG. 3. Detailed steps are as follows:

Step 800: Start.

Step 802: The linear feedback shift register 102 generates a plurality of first scramble values according to an initial value seed.

Step 804: The scramble engine 304 utilizes each odd bit of a first scramble value to execute a first logic operation on a corresponding next bit of each odd bit of the first scramble value respectively to generate a second scramble value.

Step 806: The logic gate 106 executes a second logic operation on the second scramble value and a datum from the host 108 to generate and output a scramble datum corresponding to the datum from the host 108 to the NAND flash 110; go to Step 804.

A difference between the embodiment in FIG. 8 and the embodiment in FIG. 7 is that in Step 804, the scramble engine 304 utilizes each odd bit of the first scramble value to execute the first logic operation on a corresponding next bit of each odd bit of the first scramble value respectively to generate the second scramble value corresponding to the first scramble value. For example, as shown in FIG. 3, when the scramble engine 304 receives a first scramble value 0x23 (0010_0011), the scramble engine 304 utilizes a first odd bit 1 of the first scramble value 0x23 (0010_0011) to execute the first logic operation on a next bit 1 of the first odd bit 1 of the first scramble value 0x23 (0010_0011) to generate a first even bit 0 of a second scramble value, utilizes a second odd bit 0 of the first scramble value 0x23 (0010_0011) to execute the first logic operation on a next bit 0 of the second odd bit 0 of the first scramble value 0x23 (0010_0011) to generate a second even bit 0 of the second scramble value, utilizes a third odd bit 0 of the first scramble value 0x23 (0010_0011) to execute the first logic operation on a next bit 1 of the third odd bit 0 of the first scramble value 0x23 (0010_0011) to generate a third even bit 1 of the second scramble value, and utilizes a fourth odd bit 0 of the first scramble value 0x23 (0010_0011) to execute the first logic operation on a next bit 0 of the fourth odd bit 0 of the first scramble value 0x23 (0010_0011) to generate a fourth even bit 0 of the second scramble value. As shown in FIG. 3, the first odd bit, the second odd bit, the third odd bit, and the fourth odd bit of the second scramble value are the same as the first odd bit, the second odd bit, the third odd bit, and the fourth odd bit of the first scramble value, which are 1, 0, 0, and 0, respectively, and the first even bit, the second even bit, the third even bit, and the fourth even bit of the second scramble value are 0, 0, 1, and 0, respectively. Therefore, the scramble engine 304 can generate the second scramble value 0x21 (0010_0001) through the above mentioned process. In addition, subsequent operational principles of the embodiment in FIG. 8 are the same as those of the embodiment in FIG. 7, so further description thereof is omitted for simplicity.

Figure 9:
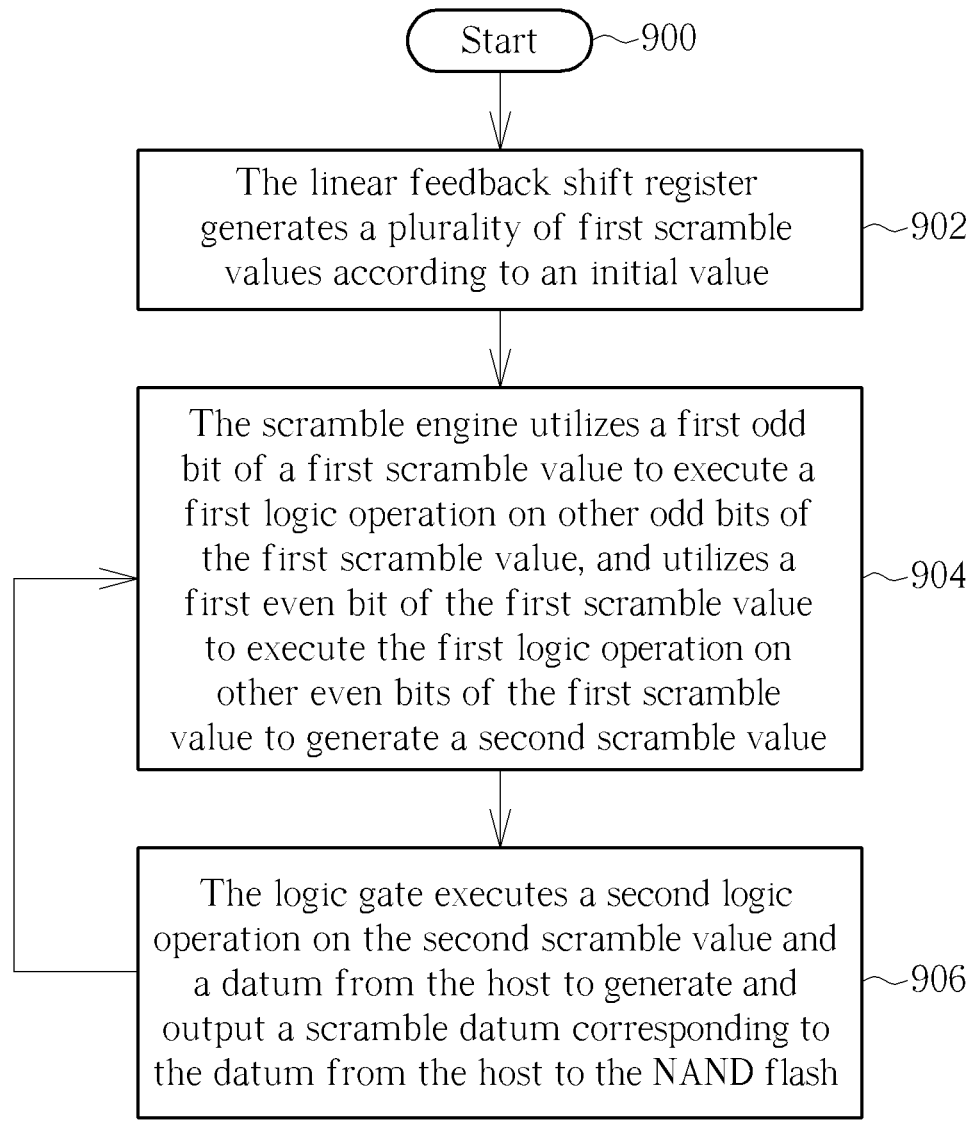
FIG. 9 is a flowchart illustrating a method of generating scramble data according to another embodiment.

Please refer to FIG. 1, FIG. 4, and FIG. 9. FIG. 9 is a flowchart illustrating a method of generating scramble data according to another embodiment. The method in FIG. 9 is illustrated using the system 100 in FIG. 1 and the scramble engine 404 in FIG. 4. Detailed steps are as follows:

Step 900: Start.

Step 902: The linear feedback shift register 102 generates a plurality of first scramble values according to an initial value seed.

Step 904: The scramble engine 404 utilizes a first odd bit of a first scramble value to execute a first logic operation on other odd bits of the first scramble value, and utilizes a first even bit of the first scramble value to execute the first logic operation on other even bits of the first scramble value to generate a second scramble value.

Step 906: The logic gate 106 executes a second logic operation on the second scramble value and a datum from the host 108 to generate and output a scramble datum corresponding to the datum from the host 108 to the NAND flash 110; go to Step 904.

A difference between the embodiment in FIG. 9 and the embodiment in FIG. 7 is that in Step 904, the scramble engine 404 utilizes the first odd bit of the first scramble value to execute the first logic operation on the other odd bits of the first scramble value, and utilizes the first even bit of the first scramble value to execute the first logic operation on the other even bits of the first scramble value to generate the second scramble value. For example, as shown in FIG. 4, when the scramble engine 404 receives a first scramble value 0x23 (0010_0011), the scramble engine 404 utilizes a first odd bit 1 of the first scramble value 0x23 (0010_0011) to execute the first logic operation on other odd bits 0, 0, and 0 of the first scramble value 0x23 (0010_0011) to generate a first odd bit 1, a second odd bit 1, a third odd bit 1, and a fourth odd bit 1 of a second scramble value, and utilizes a first even bit 1 of the first scramble value 0x23 (0010_0011) to execute the first logic operation on other even bits 0, 1, and 0 of the first scramble value 0x23 (0010_0011) to generate a first even bit 1, a second even bit 1, a third even bit 0, and a fourth even bit 1 of the second scramble value. Therefore, the scramble engine 404 can generate the second scramble value 0xDF (1101_1111) through the above mentioned process. In addition, subsequent operational principles of the embodiment in FIG. 9 are the same as those of the embodiment in FIG. 7, so further description thereof is omitted for simplicity.

Figure 10:
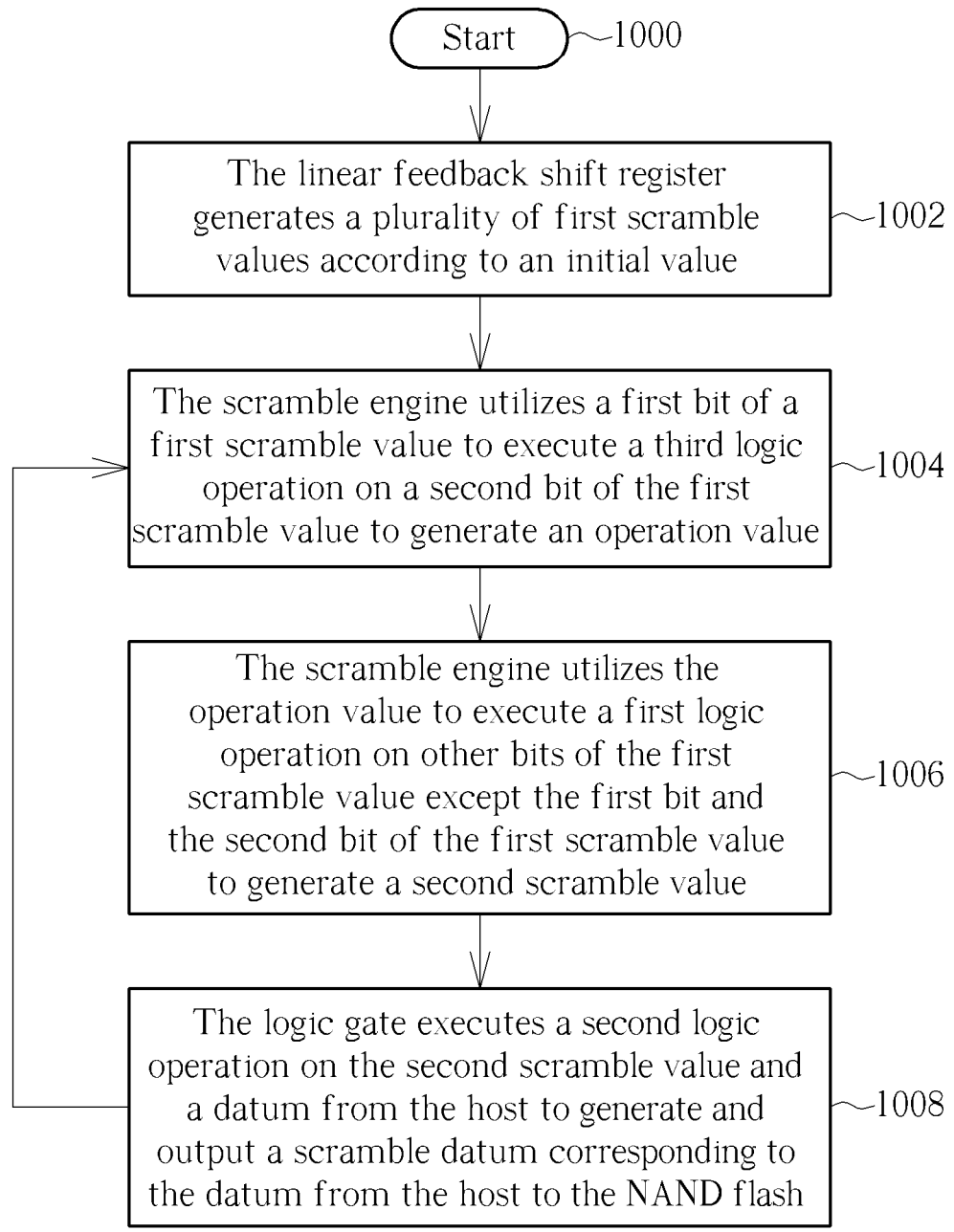
FIG. 10 is a flowchart illustrating a method of generating scramble data according to another embodiment.

Please refer to FIG. 1, FIG. 5, and FIG. 10. FIG. 10 is a flowchart illustrating a method of generating scramble data according to another embodiment. The method in FIG. 10 is illustrated using the system 100 in FIG. 1 and the scramble engine 504 in FIG. 5. Detailed steps are as follows:

Step 1000: Start.

Step 1002: The linear feedback shift register 102 generates a plurality of first scramble values according to an initial value seed.

Step 1004: The scramble engine 504 utilizes a first bit of a first scramble value to execute a third logic operation on a second bit of the first scramble value to generate an operation value.

Step 1006: The scramble engine 504 utilizes the operation value to execute a first logic operation on other bits of the first scramble value except the first bit and the second bit of the first scramble value to generate a second scramble value.

Step 1008: The logic gate 106 executes a second logic operation on the second scramble value and a datum from the host 108 to generate and output a scramble datum corresponding to the datum from the host 108 to the NAND flash 110; go to Step 1004.

A difference between the embodiment in FIG. 10 and the embodiment in FIG. 7 is that in Step 1004, the scramble engine 504 first utilizes the first bit of the first scramble value to execute the third logic operation on the second bit of the first scramble value to generate the operation value; and in Step 1006, the scramble engine 504 utilizes the operation value to execute the first logic operation on the other bits of the first scramble value except the first bit and the second bit of the first scramble value to generate the second scramble value, where the third logic operation can be an exclusive OR logic operation. But, the present invention is not limited to the third logic operation being the exclusive OR logic operation. That is to say, the third logic operation can be also other logic operations. In addition, the third logic operation is the same as or different from the first logic operation. For example, as shown in FIG. 5, when the scramble engine 504 receives a first scramble value 0x21 (0010_0001), the scramble engine 504 first utilizes a first bit 1 of the first scramble value 0x21 (0010_0001) to execute the third logic operation on a second bit 0 of the first scramble value 0x21 (0010_0001) to generate an operation value 1. Then, the scramble engine 504 utilizes the operation value 1 to execute the first logic operation on other bits of the first scramble value 0x21 (0010_0001) except the first bit 1 and the second bit 0 of the first scramble value 0x21 (0010_0001) to generate other bits 1, 1, 0, 1, 1, and 1 of a second scramble value. The first bit and the second bit of the second scramble value are the same as the first bit and the second bit of the first scramble value respectively. Therefore, the scramble engine 504 can generate the second scramble value 0xDD (1101_1101) through the above mentioned process. In addition, subsequent operational principles of the embodiment in FIG. 10 are the same as those of the embodiment in FIG. 7, so further description thereof is omitted for simplicity.

Figure 11:
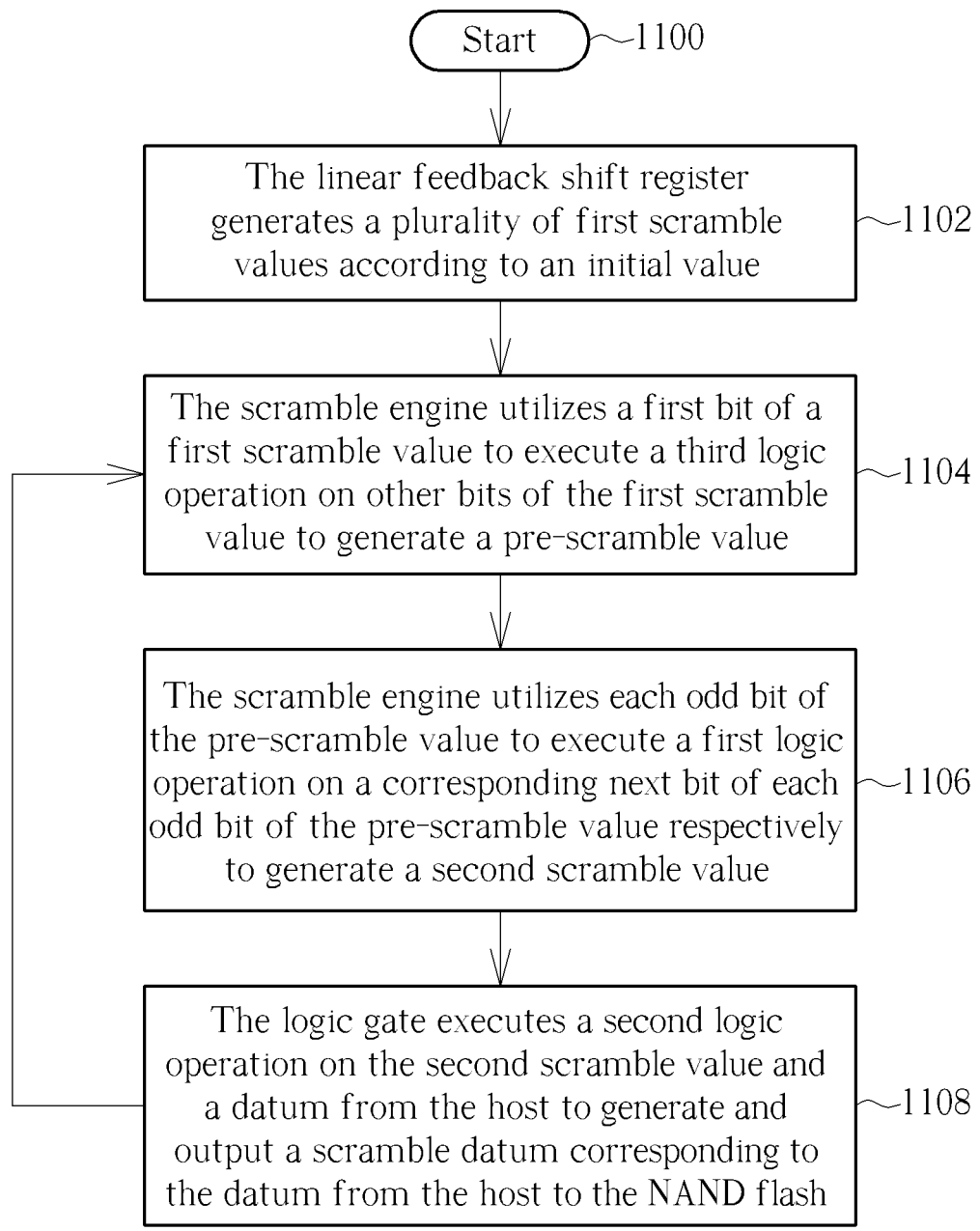
FIG. 11 is a flowchart illustrating a method of generating scramble data according to another embodiment.

Please refer to FIG. 1, FIG. 6, and FIG. 11. FIG. 11 is a flowchart illustrating a method of generating scramble data according to another embodiment. The method in FIG. 11 is illustrated using the system 100 in FIG. 1 and the scramble engine 604 in FIG. 6. Detailed steps are as follows:

Step 1100: Start.

Step 1102: The linear feedback shift register 102 generates a plurality of first scramble values according to an initial value seed.

Step 1104: The scramble engine 604 utilizes a first bit of a first scramble value to execute a third logic operation on other bits of the first scramble value to generate a pre-scramble value.

Step 1106: The scramble engine 604 utilizes each odd bit of the pre-scramble value to execute a first logic operation on a corresponding next bit of each odd bit of the pre-scramble value respectively to generate a second scramble value.

Step 1108: The logic gate 106 executes a second logic operation on the second scramble value and a datum from the host 108 to generate and output a scramble datum corresponding to the datum from the host 108 to the NAND flash 110; go to Step 1104.

A difference between the embodiment in FIG. 11 and the embodiment in FIG. 7 is that in Step 1104, the scramble engine 604 first utilizes the first bit of the first scramble value to execute the third logic operation on the other bits of the first scramble value to generate the pre-scramble value; and in Step 1106, the scramble engine 604 utilizes each odd bit of the pre-scramble value to execute the first logic operation on a corresponding next bit of each odd bit of the pre-scramble value respectively to generate the second scramble value, where the third logic operation can be an exclusive OR logic operation. But, the present invention is not limited to the third logic operation being the exclusive OR logic operation. That is to say, the third logic operation can be also other logic operations. In addition, the third logic operation is the same as or different from the first logic operation. For example, as shown in FIG. 6, when the scramble engine 604 receives a first scramble value 0x23 (0010_0011), the scramble engine 604 first utilizes a first bit 1 of the first scramble value 0x23 (0010_0011) to execute the third logic operation on other bits 0, 0, 1, 0, 0, 0, and 1 of the first scramble value 0x23 (0010_0011) to generate a pre-scramble value 0xDD (1101_1101) corresponding to the first scramble value 0x23 (0010_0011). Then, the scramble engine 604 utilizes a first odd bit 1 of the pre-scramble value 0xDD (1101_1101) to execute the first logic operation on a next bit 0 of the first odd bit 1 of the pre-scramble value 0xDD (1101_1101) to generate a first even bit 1 of a second scramble value, utilizes a second odd bit 1 of the pre-scramble value 0xDD (1101_1101) to execute the first logic operation on a next bit 1 of the second odd bit 1 of the pre-scramble value 0xDD (1101_1101) to generate a second even bit 0 of the second scramble value, utilizes a third even bit 1 of the pre-scramble value 0xDD (1101_1101) to execute the first logic operation on a next bit 0 of the third even bit 1 of the pre-scramble value 0xDD (1101_1101) to generate a third even bit 1 of the second scramble value, and utilizes a fourth odd bit 1 of the pre-scramble value 0xDD (1101_1101) to execute the first logic operation on a next bit 1 of the fourth odd bit 1 of the pre-scramble value 0xDD (1101_1101) to generate a fourth even bit 0 of the second scramble value. As shown in FIG. 6, the first odd bit, the second odd bit, the third odd bit, and the fourth odd bit of the second scramble value are the same as the first odd bit, the second odd bit, the third odd bit, and the fourth odd bit of the pre-scramble value, which are 1, 1, 1, and 1, respectively, and the first even bit, the second even bit, the third even bit, and the fourth even bit of the second scramble value are 1, 0, 1, and 0, respectively. Therefore, the scramble engine 604 can generate the second scramble value 0x77 (0111_0111) through the above mentioned process. In addition, subsequent operational principles of the embodiment in FIG. 11 are the same as those of the embodiment in FIG. 7, so further description thereof is omitted for simplicity.

To sum up, the system of generating scramble data and the method of generating scramble data utilize the scramble engine to generate a second scramble value according to a first scramble value generated by the linear feedback shift register, where a correlation between any two adjacent second scramble values is low. Therefore, a correlation between any two adjacent scramble data generated by the present invention through the logic gate is also low. Thus, compared to the prior art, scramble data generated by the present invention can satisfy a specification of the NAND flash.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system of generating scramble data, the system comprising:
   a linear feedback shift register (LFSR) for generating a plurality of first scramble values according to an initial value; and
   a scramble engine coupled to the linear feedback shift register for receiving the plurality of first scramble values and making each bit of a first scramble value of the plurality of first scramble values be operated to generate a second scramble value corresponding to the first scramble value, wherein the second scramble value does not correspond to data from a host and a bit number of the second scramble value is the same as a bit number of the first scramble value.

2. The system of claim 1, further comprising:
   a logic gate coupled to the scramble engine for executing a second logic operation on the second scramble value and a datum from a host to generate and output a scramble datum corresponding to the datum to a NAND flash, wherein a bit number of the datum, the bit number of the second scramble value, and a bit number of the scramble datum are the same.

3. The system of claim 2, wherein the logic gate is an exclusive OR gate, and the second logic operation is an exclusive OR logic operation.

4. The system of claim 1, wherein the scramble engine utilizes a first bit of the first scramble value to execute a first logic operation on other bits of the first scramble value to generate the second scramble value.

5. The system of claim 1, wherein the scramble engine utilizes each odd bit of the first scramble value to execute a first logic operation on a corresponding next bit of the odd bit of the first scramble value respectively to generate the second scramble value.

6. The system of claim 1, wherein the scramble engine utilizes a first odd bit of the first scramble value to execute a first logic operation on other odd bits of the first scramble value, and utilizes a first even bit of the first scramble value to execute the first logic operation on other even bits of the first scramble value to generate the second scramble value.

7. The system of claim 1, wherein the scramble engine first utilizes a first bit of the first scramble value to execute a third logic operation on a second bit of the first scramble value to generate an operation value, and then utilizes the operation value to execute a first logic operation on other bits of the first scramble value except the first bit and the second bit of the first scramble value to generate the second scramble value.

8. The system of claim 7, wherein the third logic operation is the same as or different from the first logic operation.

9. The system of claim 1, wherein the scramble engine first utilizes a first bit of the first scramble value to execute a third logic operation on other bits of the first scramble value to generate a pre-scramble value, and then utilizes each odd bit of the pre-scramble value to execute a first logic operation on a corresponding next bit of the odd bit of the pre-scramble value respectively to generate the second scramble value.

10. The system of claim 9, wherein the third logic operation is the same as or different from the first logic operation.

11. The system of claim 1, wherein the first logic operation is an exclusive OR logic operation.

12. A system of generating scramble data, the system comprising:
   a linear feedback shift register for generating a plurality of first scramble values according to an initial value; and
   a scramble engine coupled to the linear feedback shift register for making each bit of each first scramble value of the plurality of first scramble values be operated to generate a second scramble value corresponding to the first scramble value, wherein the second scramble value does not correspond to data from a host and at least one bit of the first scramble value is operated more than once to generate the second scramble value.

13. A system of generating scramble data, the system comprising:
   a linear feedback shift register for generating a first scramble value according to an initial value; and
   a scramble engine coupled to the linear feedback shift register for making each bit of the first scramble value be operated to generate a second scramble value corresponding to the first scramble value, wherein the second scramble value does not correspond to data from a host and at least one bit of the second scramble value is generated by a combination of logic operations.

* * * * *